July 30, 1957 R. WEINSTOCK 2,801,411
WAVE SHIELD
Filed May 12, 1954
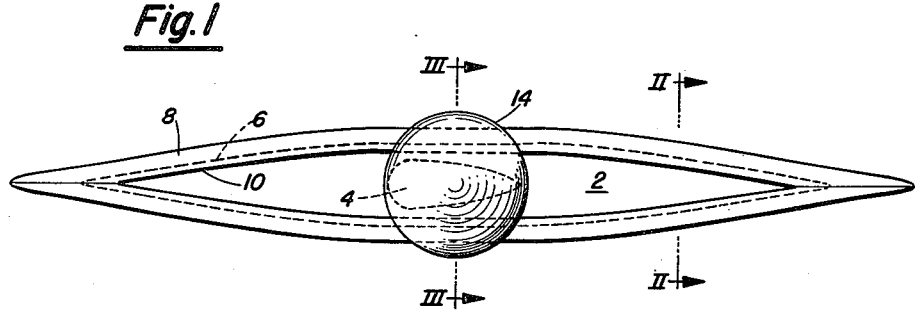
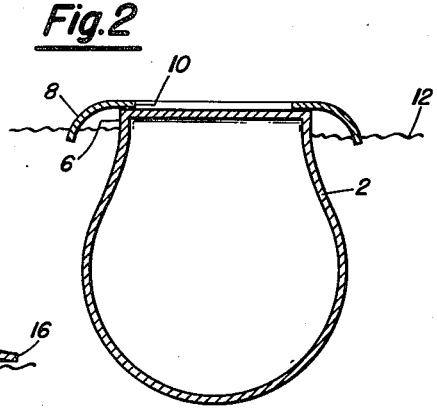
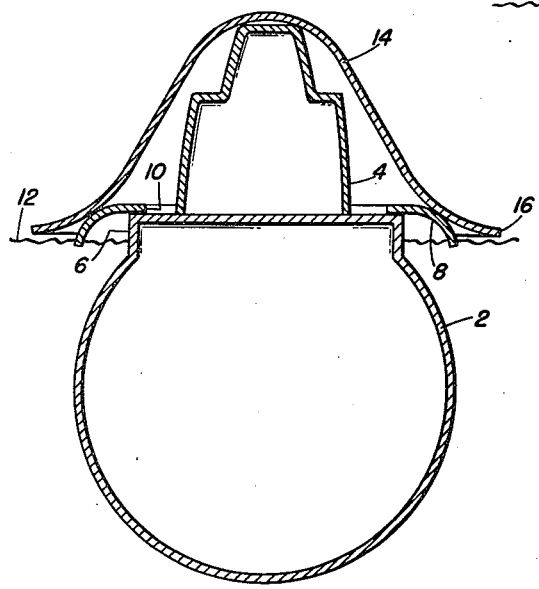
INVENTOR.
Robert Weinstock
BY George Sipkin
Attorneys

# United States Patent Office 2,801,411
Patented July 30, 1957

2,801,411
WAVE SHIELD

Robert Weinstock, Palo Alto, Calif., assignor to the United States of America as represented by the Secretary of the Navy Application May 12, 1954, Serial No. 429,419

2 Claims. (Cl. 343—18)

This invention relates to apparatus for modifying radiated waves and, more particularly, to apparatus for attenuating or reducing the magnitude of the wave reflections or echoes from radar transmissions and the like.

As is well known, surface radar is a highly effective instrument for accurately detecting range and bearing of surface targets, and such detection generally is accomplished by transmitting a beam or pulse of a general area and observing on a suitable scope or plot, the energy echoes reflected from a target back to the receiver. Also, as would be expected, the advent of radar brought with it a need for counter-measures such as might render the instruments relatively ineffective either by avoiding detection or by imposing such false directional indications on the echoes as to confuse the operators. This latter counter-measure, which has been the principal approach to the problem, has been accomplished in various manners, such as by the provision of modulating apparatus designed to vary the strength of the reflected echo and introduce an error in the observations. As another approach, the surfaces of some targets have been plated with a layer of semi-conducting material of various composition capable of producing erroneous radar measurements. The art on this subject is rather replete with a variety of expedients that are effective in varying degrees for their designated job, but, nevertheless, as far as is presently known, no practical manner has been devised that is capable of successfully shielding a surface target, such as a submarine, from the present day surface search radars. This is not to say that such shielding has been incapable of accomplishment. The difficulty has been more in the inability to provide any means which is practical for use on targets such as submarines where weight and space limitations are so critical as to eliminate the more cumbersome and complex counter-measure equipment that has been offered.

It is, therefore, a broad object of the present invention to provide radar echo attenuating apparatus that is practical for use on submarine and other targets having equivalent limitations.

Another object is to reduce the magnitude of radar echoes and thereby decrease the range at which a surface craft may be detected by a radar system.

A further object is to attenuate the specular and non-specular radar echoes presented to an observing radar system.

Still another object is to shield the vertical surfaces of the hull and superstructure of a vessel.

Other objects will become apparent from the detailed description and the accompanying drawing.

As already has been indicated, the purposes of the present invention are fulfilled by the use of a shield adapted to cover the reflecting surfaces of a surface craft in such a manner as to attenuate or reduce the magnitude and forde of such echoes as are reflected from the screen itself. It is well known that the strongest radar echoes reflected from a given surface occur when that surface, or a considerable portion of it, is oriented perpendicularly to the radiated beam, and such reflections generally are known specular echoes. On the other hand, when there is no specular return of electromagnetic radiation, the existing situation may be one in which the radiations have been diffracted to the edges of the target surface and reflections emanating from such diffracted radiations at these edges are known as non-specular echoes.

In the present invention, the shielding reduces the possibility of detection due to either the specular or non-specular echoes and, in the preferred embodiment, this is accomplished by providing a special cover for the perpendicular surfaces of both hull and the superstructure. For use on the hull, the cover, which may be a conductive sheet or screen, may take the form of a curved apron designed to circumscribe the hull, the upper edge of the apron extending horizontally and being fastened to the deck of the submarine and the lower edge terminating in a horizontal plane surface, or alternatively extending into the sea. As to such superstructure as the conning towers or gun mounts, the shielding sheet or screen may take the form of a bell-shaped shell. However, in either the apron or the shell it is of maximum importance to assure that all radii of curvature should be large as compared with the radiation wave length, or, in other words, it is important that these surfaces be gradually sloped to as great a degree as practical to avoid sharp bends. The specular echoes are avoided by assuring these significant deviations from the vertical to the extent that the surfaces offer no portion that approaches a relative perpendicular disposition to any portion of the electromagnetic radiations or waves. The non-specular echoes are effectively controlled by eliminating any edges, points or other projections such as might have an elevation sufficient to reflect detectable echoes to the receivers. For this purpose the upper and lower edges of the apron both are tapered off into a horizontal plane, although, as stated, these lower edges may be extended into the sea at any angle. Similarly, the bell-shaped covers for the conning tower and mounts should have their upper extents smoothly rounded-off and their lower edges tapered into substantial horizontal disposition. Intermediate surfaces between these upper and lower edges also should be gradually sloped to avoid sharp angles such as might give off non-specular echoes and, as one practical guide, the curvature of these surfaces can be made 30 degrees more than the maximum angle of list for the particular craft receiving the installation. At least, the curvatures should have a gradation which assures that the inclination from the vertical is everywhere more than the maximum angle of elevation from or to an echo receiver.

The preferred embodiment of the invention is illustrated in the accompanying drawings, of which Fig. 1 is a schematic plan view of a submarine mounting the shields of this invention, and Figs. 2 and 3 are enlarged cross-sectional views taken along lines II—II and III—III of Fig. 1.

Referring to the drawings, the invention is particularly adapted for use on a submarine, such as submarine 2, and, as can be appreciated, any reduction in the magnitude of an echo reflected to the observing radar will decrease the range at which the target vessel can be detected by an enemy radar. As stated, the strongest echoes occur when the surface, or a considerable portion thereof, is oriented perpendicular to the beam, and, on a submarine, such surfaces are formed by a conning tower 4, freeboard surfaces 6 and gun mounts which are not shown since they can be protected in the same manner as the conning tower. Not only do these surfaces provide the specular echoes but, in addition, their edges collect diffracted radiations which form the non-specular effects.

For protecting the freeboard surfaces, a shield in the form of a curved apron 8 may be provided, upper edges 10 of the shield being suitably attached along the periphery of the deck circumferentially of the hull for insuring protection from all directions. The lower edges of the apron, preferably, extend outwardly and downwardly into water level 12, although they may be projected horizontally. For minimizing non-specular or diffraction echoes, it is desirable that the upper portion of the apron extend in a horizontal plane and that portions below this horizontal plane gradually slope down into the sea. This gradual slope should, as stated, provide the apron with radii of curvature that are large as compared with radiation wave lengths, the practical guides and limitations of the curvature having been stated previously.

For the protection of the submarine super-structure, such as a gun mount or conning tower, the shield may be in the form of a bell-shaped shell 14 of sufficient size to cover the particular structure and be suitably secured in place. Here again the inclination of shell 14 should deviate everywhere from the vertical by more than the maximum angle of elevation from an observing radar and it has been found that 30 degrees more than the maximum angle of list should be sufficient. Also, the shell, preferably, should be approximately a surface of revolution, although deviations from circular horizontal cross sections may be necessitated by the shape of the superstructure.

Finally, for non-specular echo reduction, it is important that the top of the shell be rounded off smoothly or not pointed, and that the slope of the shell gradually decrease from this rounded surface to provide a horizontal base 16. As to materials, both the shielding apron and the shell may be of electrical conductors in the form of either metal sheet or a screen. If a screen is used, the linear dimensions of the screen should be quite small as compared with the radiation wave length of the detecting radar.

As may now be appreciated, shields constructed and mounted in accordance with the teachings of the invention eliminate the existence of any surfaces capable of creating specular or non-specular echoes and, to this extent, any echoes reflected from the shield surfaces will be so reduced in magnitude as to very materially reduce the range of possible detection. Also of importance is the fact that this protective countermeasure is provided in a practical manner in that it requires no permanent interior installation and instead can be easily stowed on a relatively small desk space and then extended for use as needed.

Obviously, many modifications and variations of the present invention are possible in the light of the above teachings. It is, therefore, to be understood that within the scope of the appended claims the invention may be practiced otherwise than as specifically described.

I claim:

1. Apparatus for attenuating radiated radar echoes reflected from vertical surfaces of a ship's structure comprising a shielding screen constructed of electrically conductive rigid material adapted to be mounted over the vertical surfaces of the structure, said screen having smoothly curved side surfaces provided with radii of curvature which are large as compared with the radiated wave length, the top surfaces of the screen extending in substantially a horizontal direction and said bottom surfaces terminating with respect to the surface of the sea in a manner to minimize the non-specular echoes.

2. Apparatus for attenuating radar echoes reflected from vertical surfaces of a submarine, the apparatus comprising an apron constructed of an electrically conductive rigid sheet material and formed with a horizontally extending upper edge adapted to be attached to the deck of said submarine, said apron extending outwardly and downwardly with a curvature substantially greater than radiated wave lengths from said horizontal edge and terminating in a lower edge adapted to project below the water line of the submarine, said apparatus also including a bell-shaped shell constructed of an electrically conductive sheet material and formed with horizontally extending upper and lower portions, said shell being adapted to fit over projections extending upwardly from said submarine deck with said lower edges being disposed in proximity to said water line, the intermediate portion of said bell between said upper and lower edges being smoothly curved and provided with radii of curvature substantially greater than radiated wave lengths.

References Cited in the file of this patent

"Radar System Engineering," volume 1 of the MIT Radiation Laboratory Series, published 1947 by McGraw-Hill Book Company, Inc.